United States Patent Office 3,317,321
Patented May 2, 1967

3,317,321
PHOTOCHROMIC COMPOSITIONS COMPRISING DOPED INORGANIC METAL OXIDES SUSPENDED IN POLYESTER BINDERS
John A. Chopoorian, Stamford, Conn., assignor to American Cyanamid Company, Stamford, Conn., a corporation of Maine
No Drawing. Filed Nov. 21, 1962, Ser. No. 239,335
13 Claims. (Cl. 96—88)

This invention relates to novel compositions of matter. More particularly, this invention relates to novel compositions of matter comprising polyester resins having uniformly dispersed throughout the body thereof, an inorganic photochromic material. Still more particularly, this invention relates to novel compositions of matter comprising thermoplastic and thermosetting polyester resins having uniformly dispersed throughout the body thereof, a photochromic material comprising various inorganic metal oxides.

Photochromic materials are known and have been used as the active ingredients in such articles as data storage devices, reflectants for incident high-intensity radiation, photochemical printing and the like. There has, however, to my knowledge, been no disclosure of the production of compositions of matter comprising highly stable, very sensitive, rapid color-changing photochromic materials uniformly dispersed throughout polyester resins produced from polycarboxylic acids and polyhydric alcohols.

I have discovered that certain metal oxide photochromic materials may be directly and uniformly incorporated into polyester resins by physically blending or admixing the polyester with the photochromic material. It was indeed surprising and unexpected to find that the photochromic inorganic oxides still functioned as efficiently in a solid polyester binder as in the solid uncombined state. It is well known that many solid inorganic photochromic materials which change their color in the solid state, do not continue to function as photochromic materials after having been dispersed throughout a solid binder. For example, $TiO_2$ doped with an iron oxide, functions as a photochromic material in the pure solid state, however, upon incorporation thereof into a solid glass binder, will not change color upon contact with ultraviolet rays.

However, I have discovered novel compositions of matter comprising thermoplastic and thermosetting polyester resins containing certain inorganic metal oxides, in uniform molecular distribution, which continue to function as photochromic materials upon contact with irradiation, i.e. ultraviolet light. These novel compositions thereby permit the temporary recording of data, images or designs and the production of various articles heretofore not possible utilizing prior art products. Additionally, the products are produced in an easily-handled state.

The prior art devices of this type present many deficiencies and problems which have heretofore been very difficult to overcome. In regard to various commercially available storage devices and photographic instruments for instance, the light sensitive material must be prevented from coming into contact with white light, such as by storage in the dark or by coating the material with a protective film, such as a gel or tin foil etc. The compositions of my invention, however, need only be removed from the light a short time before use in order to be transformed back to their original color. Additionally, these prior art devices decompose rapidly because of their relatively poor stability and therefore must be used within a certain date after their manufacture. However, the novel compositions of matter of the present invention are very stable, easily handled, can be stored for extended periods of time without fear of damage of white light and still possess all the properties necessary and desired for the above-enumerated uses.

The novel compositions of my invention are moldable, castable etc. by all known techniques into discs, plates, films, foils and the like. Since the color change of the photochromic compounds, more fully discussed hereinbelow, is evident in the solid state in admixture with the polyester resins, the necessity of laminated construction and/or encapsulation and their accompanying disadvantages in the use of other photochromic materials have been obviated by my novel compositions.

It is an object of the present invention to provide novel compositions of matter.

It is a further object of the present invention to provide novel compositions of matter comprising polyester resins having uniformly dispersed throughout the body thereof, an inorganic photochromic material.

It is a further object of the present invention to provide novel compositions of matter comprising thermoplastic and thermosetting polyester resins produced from polycarboxylic acids and polyhydric alcohols having uniformly dispersed therethrough, a photochromic material comprising various inorganic metal oxides.

These and other objects will become more apparent to those skilled in the art upon reading the more detailed description of my invention set forth hereinbelow.

As mentioned above, molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation in absorption, spectrum for the system changes drastically, but when the irradiation source is removed the system reverts to its original state.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

A. ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the screening coefficients of other components of the system, and the wavelengths of the incident radiation.

B. QUANTUM YIELD

All excited molecules will not undergo transformation to the colored form, so that the quantum yield will generally be less than unity. Various deactivating processes which compete for the excited molecules include fluorescence, phosphorescence, permanent chemical change and thermal release.

C. THE REVERSE REACTION

In both the forward and reverse reactions, the concentration of the colored form is dependent on the intensity of the radiation, the kinetics of the reverse reactions, and temperatures of the reactions. The kinetics for the reverse reaction will normally be controlling, however some reverse reactions are thermally sensitive and are accelerated by irradiation or heating.

By the terms "photochromic compound," "photochromic substance" or "photochromic material," as used in the instant disclosure, is meant compounds, substances or materials which change their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomena. In fact, such compounds have been widely used in various ways, as described above. Generally, these compounds change their color when exposed to ordinary sunlight and revert back to their original color upon removal thereof from the rays of the sun. Various other materials, however, change color only when subjected to a certain degree of irradiation, and as such, sunlight will not effect them. High intensity radiation, such as 10–25 cal./cm.$^2$/sec or more is necessary in regard to these compounds, while sunlight (0.2 cal./cm.$^2$/sec.) will affect the former.

I have discovered that a group of photochromic materials may be incorporated into polyester resins thereby forming the novel compositions of the present invention having the several advantages mentioned above.

These photochromic materials are admixtures of inorganic metal oxides. The admixtures generally consist of a primary or host inorganic metal oxide doped with a lesser or contaminating amount of another guest inorganic metal oxide. The admixtures which are contemplated as useful in the novel compositions of my invention are the following: $TiO_2$ doped with $Fe_2O_3$, FeO, $Cr_2O_3$, CuO, NiO, $MnO_2$ or $Mn_2O_3$; $Nb_2O_5$ doped with $Fe_2O_3$, FeO, $Cr_2O_3$, CuO, $V_2O_5$, $MnO_2$ or $Mn_2O_5$; $Al_2O_3$ doped with $Cr_2O_3$ or $V_2O_5$; ZnO doped with CuO or $V_2O_5$; $SnO_2$ doped with CuO; or $ZrO_2$ doped with CuO or NiO. In regard to the $TiO_2$, the rutile form of the compound is sufficient, however, the anatase form containing at least 5% of the rutile material is preferred. These admixtures contain from about 0.01 to 5.0 mole percent of the doping guest oxide, preferably 0.1 to 2.0 mole percent, based on the number of moles of the host oxide.

These doped oxides are well known in the art and generally may be prepared by any applicable method. Various methods which may be used include those set out in the following articles. Williamson, Nature (London), 140, 238 (1937); McTaggert et al.; Appl. Chem., 5, 643 (1955); Frydryck, Doctoral Thesis, Free University of Berlin (1961), and additionally the method set forth hereinbelow.

I have also discovered a second group of photochromic materials that may be employed in the present invention. The second group comprises admixtures of $TiO_2$ with a combination of two doping (guest) metal oxides. I have found that these mixtures of guest oxides, in admixture with $TiO_2$, exhibit a more pronounced effect in the color intensity of the products than either doping metal (guest) oxide used alone. For example, $TiO_2$ doped with $Fe_2O_3$ or FeO and NiO or $TiO_2$ doped with $Fe_2O_3$ or FeO and CuO, result in a more intense color change than $TiO_2$ doped with $Fe_2O_3$, FeO, NiO or CuO, alone. That is to say, a synergistic effect is observed wherein the results obtained utilizing a mixture of guest oxides is better than that obtained from either guest oxide alone or the mere additive results of both together. Here, again, the rutile form of the host compound is satisfactory, but the anatase form containing at least 5% of the rutile material is preferred. When a combination of the different doping oxides are used, amounts ranging from 100:1 to 10:1, preferably 25:1 to 5:1, of the iron oxide to the nickel or copper oxide are satisfactory, the total amount of the mixed oxides still however, being with the range (in mole percent) specified above.

These admixtures of host and guest oxides, either, as such, or with combinations of doping guest oxides, may be prepared, among other methods, by slurrying a solution of the doping metal oxide salt, the guest metal oxide itself, or mixtures thereof, with the host metal oxide. The slurry is evaporated and ground, then calcined at a temperature between 400° and 1100° C. to give the active admixture. In the case of $TiO_2$, the host crystalline compound desired can be previously prepared, or starting the admixture preparation with anatase, the desired final proportion of rutile can be controlled by the length of time the admixture is calcined above the phase transition temperature (Ca. 800° C.). The final active admixtures are not merely mechanical or physical blends, but are crystalline materials consisting of a host material matrix wherein is contained substitutionally or interstitially, the doping guest metal oxide.

I have also discovered another group of photochromic inorganic oxide admixtures which may be used in the compositions of the present invention. This third class of materials, in order of preference, is $TiO_2$ in admixture with $MoO_3$ or $WO_3$. These admixtures are produced in mole ratios of about 1 to 15 moles of $TiO_2$ to about 25 to 1 moles of $MoO_3$ and $WO_3$. The preferred mole ratios range from about 1:4 to about 12:1, respectively. The $TiO_2$ component may be in either the rutile, anatase, or mixed phase form, and in place of $TiO_2$, other metal oxide components may be used, such as, for example, ZnO, $ZrO_2$, $SnO_2$ and $GeO_2$ in the same mole ratio given above for $TiO_2$.

These two phase materials constituting the third class of photochromic materials are novel compounds and are prepared as described and claimed in copending application, Ser. No. 239,159 filed concurrently herewith. In a typical procedure, the compounds are prepared by dissolving the $MoO_3$ or $WO_3$ in an aqueous basic solution and adding to this solution an acidified aqueous slurry or solution of the primary metal oxide component. After heating at up to 100° C. for several hours or longer, the desired active material is formed in very high yield, separated from the solvent, washed free of acid, and dried.

Superifically taken, it would appear that the third class of materials are merely a mechanical or physical mixture of the two oxide componnets. However, these latter chemically prepared coprecipitated materials are of extremely great photo-sensitivity in comparison to a mixture of their individual metal oxides. Additionally, X-ray evidence clearly indicates that the crystalline matrix of the $MoO_3$ or $WO_3$ has been completely altered. Although not wishing to be bound by any particular theory, it is possible that this phenomena can be explained as follows. Since the photochromic color in these compounds is deep blue, the most likely theoretical alternatives as to the nature of this photochromic reaction is that a net electron delocalization to Mo or W takes place either by an inter– or intra-phase photoinitiated electron transfer from the second component of the active material. Because of the degradation of these Mo and W compounds at higher temperatures, it is preferred that the polyesters containing them be cast instead of molded, however, molding them is possible, although somewhat less practical than casting.

The amount of the inorganic metal oxide (photochromic material), in any instance, incorporated into the polyester resin is not critical and depends upon the intensity of the color of the composition desired upon irradiation thereof. Generally, however, it is necessary to incorporate at least about 1.0% and usually up to about 70%, by weight, of the photochromic material into the polyester, based on the weight of the polyester resin. It is preferred, however, that more than 20% by weight, of the photochromic material be added.

The polyester resins employed in the practice of the present invention may be either thermoplastic or thermosetting. They are all well known in the art and are prepared by reacting polycarboxylic acids, or their anhydrides, with polyhydric alcohols. The thermosetting polyesters are prepared using a procedure wherein at least one of the reactive components contains $\alpha,\beta$-ethylenic unsaturation. By following this procedure, resinous, essentially linear esterification or condensation products, containing a plurality of ethylenically unsaturated linkages distributed along the backbones of their polymer chains, are produced.

The use of $\alpha,\beta$-ethylenically unsaturated polycarboxylic acids provides a convenient method of introducing ethylenic unsaturation into the polyester resins. It is preferred to employ $\alpha,\beta$-ethylenically unsaturated dicarboxylic acids, such as maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen, may also be used.

Whenever available, the anhydrides of any of the aforementioned $\alpha,\beta$-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and especially saturated aliphatic diols, are preferred as coreactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

In forming the thermoplastic polyester resins useful herein, the above alcohols are reacted with non-polymerizable polycarboxylic acids, i.e. acids which are saturated or which contain only benzeneoid unsaturation, such as oxalic, malonic, succinic, glutaric, adipic, pimelic, suberic, azelaic, sebacic, malic, tartaric, tricarballylic, citric, phthalic, isophthalic, terephthalic, cyclohexanedicarboxylic, endomethylene-tetrahydrophthalic, and the like, as well as mixtures thereof.

These saturated acids may be used alone to form thermoplastic resins or in combination with the above-mentioned unsaturated acids in the formation of the thermosetting resins, in order to impact many beneficial properties thereto. For example, non-polymerizable polycarboxylic acids, having only two carboxyl groups, and no other reactive substituents, may be employed to impart a desirable degree of flexibility which may not be achieved by the use of the $\alpha,\beta$-ethylenically unsaturated polycarboxylic acids alone. Where such non-polymerizable polycarboxylic acids are employed, the amount thereof should constitute at least about 20% but not more than about 80% of the total equivalents of carboxyl groups present in the esterification mixture. Preferably, such non-polymerizable polycarboxylic acids may be employed in amounts ranging from about 25% to about 75% of the total equivalents of carboxyl groups present in the esterification mixture.

Halogenated unsaturated polycarboxylic acids may also be employed in the preparation of the thermosetting polyester resins of the present invention for purposes of imparting various desirable properties thereto, as mentioned above in regard to the saturated acids. Examples of halogenated acids which may be used include monochloro- and monobromomaleic, monochloro- and monobromofumaric, monochloro- and monobromomalonic, dichloro- and dibromomalonic, monochloro- and monobromosuccinic, $\alpha,\beta$-dichloro- and dibromosuccinic, hexachloroendomethylenetetrahydrophthalic, and the like, as well as mixtures thereof. Whenever available, the anhydrides of any of these halogenated acids may also be substituted therefore in whole or in part.

Among the halogenated polyols that may be employed are 2,2'-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachloro-cyclopentadiene. Among the latter are compounds such as 3-[1,4,5,6,7,7 - hexachlorobicycle-(2.2.1)-5-hepten-2-yloxy]-1,2-propanediol, which is the adduct of hexachloro-cyclopentadiene with vinyl glycerol ether, 3-[1,4,5,6,7,7-hexachlorobicyclo(2.2.1)-5-hepten-2-yl]-methoxy-1,2-propanediol, which is the adduct of hexachlorocyclopentadiene with allyl glycerol ether, adducts of hexachlorocyclopentadiene with vinyl and allyl ethers of pentaerythritol, and the like. Mixtures of these halogenated polyols may also be employed, if desired.

The esterification mixtures, from which both the thermoplastic and the thermosetting polyester resins employed in the practice of the present invention are prepared, are generally formulated so as to contain at least a stoichiometric balance between carbonyl and hydroxyl groups. Thus, where a diol and a dicarboxylic acid are employed, they are usually reacted on at least a mol to mol basis. In common commercial practice, a small excess of polyol, usually in the range of from about 5% to about 15% excess, is employed. This is done primarily for economic reasons, i.e. to insure a rapid rate of esterification.

Both types of polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol.

The esterification mixture should be sufficiently reacted so as to ultimately produce a polyester resin having an acid number not appreciably more than about 75. It is preferred to employ polyester resins having acid numbers ranging from about 30 to about 50, or below.

Further details pertaining to the preparation of polyester resins of the types employed in the practice of the present invention are disclosed in U.S. Patent No. 2,255,313, to Ellis, and in U.S. Patents Nos. 2,443,735 to 2,443,741, inclusive, to Kropa, and these patents are hereby incorporated into the present application by reference.

The thermosetting polyester resins of the present invention, in combination with the photochromic inorganic oxides, may be cross-linked by the addition of a suitable cross-linking agent.

The thermosetting polyester resins are cross-linked by admixing them with a monomer compound containing the polymerizable $CH_2=C<$ group to give a composition that may be cured to a stable thermoset condition. One may use about 10 parts by weight of the monomeric material to about 90 parts by weight of the polyester resin up to about 60 parts of the monomeric material to about 40 parts of the polyester resin. The preferred embodiment, however, is to use from about 25 parts of the monomeric material to about 35 parts of the monomeric material with about 75 parts to about 65 parts, respectively, of the polyester resin.

The monomeric material containing the polymerizable $CH_2=C<$ group which may be used in the practice of the present invention, has a boiling point of at least 60° C. Among the polymerizable monomeric materials that will find use in my invention are styrene, sidechain alkyl and halo substituted styrenes such as alpha methylstyrene, alpha chlorostyrene, alpha ethylstyrene and the like or alkyl and halo ring-substituted styrenes such as ortho, meta and paraalkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like. Still further, one can make use of the allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl citraconate, the diallyl ester of muconic acid, diallyl itaconate, diallyl chlorophthalate, diallyl dichlorosilane, the diallyl ester of endomethylene tetrahydrophthalic anhydride, the diallyl ester of tetrachloro endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane and the like. These monomeric materials may be used either singly or in combination with one another.

When the thermosetting polyester resin is combined with the cross-linking monomeric material it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur compounds and the like. The concentration of the inhibitor is preferably low and as a general rule less than 1% by weight is usually sufficient. However, with the preferred inhibitors, e.g., polyhydric phenols and aromatic amines, one may make use of such small amounts as 0.01%–0.1% by weight.

The polyester resins of the present invention will find application in a great plurality of field such as in the preparation of laminates and other reinforced plastics, coating compositions, adhesive compositions, molding compositions, potting, films, foils, fibers, and the like.

The thermosetting polyester resins can readily be solidified without benefit of catalyst by the application of heat or by the application of heat and pressure. However, in such an operation, without benefit of a catalytic agent, the time element makes it desirable to incorporate into the composition conventional polymerization catalysts such as the organic superoxides, the alcoholic and acidic peroxides. Among the preferred catalysts are: the acidic peroxides, e.g., benzoyl peroxide, phthalic peroxide, succinic peroxide and benzoyl acetic peroxide; fatty oil acid peroxides, e.g. coconut oil acid peroxides, lauric peroxide, stearic peroxide and oleic peroxide; alcohol peroxides, e.g., tertiary-butyl hydroperoxide, usually called tertiary-butyl peroxide and terpene oxides, e.g., ascaridole. Still other polymerization catalysts might be used in some instances, e.g., soluble cobalt salts (particularly the linoleate and naphthenate), p-toluene sulfonic acid, aluminum chloride, stannic chloride, boron trifluoride and azobisisobutyronitrile.

As mentioned above, the method used to prepare the polyester resins used in the formation of the novel compositions of the present invention is not critical and any known method may be used. The only criteria which must be followed in adding the photochromic oxide compound to the polyester resin is in regard to the residual acid and/or anhydride present in the polyester after the production thereof. The photochromic oxide cannot be added to the polyester formulation until substantially all of the residual, free acid and/or anhydride present therein is removed, since the acid and/or anhydride tends to react or neutralize the photochromic oxide compound thereby nullifying its reversible color change ability. The residual acid and/or anhydride present in the polyester as produced, may be removed therefrom by washing the resin with a basic material such as sodium hydroxide, potassium hydroxide, sodium carbonate and the like at a temperature ranging from 15–25° C., although other methods are equally as applicable. After the removal of substantially all the residual acid and/or anhydride, the polyester resin may then be physically blended with the photochromic material. Known procedures such as utilizing a ball mill, a tumbler mixer, hot rolls, emulsion blending techniques, a Banbury mixer, or various other blendors known to those skilled in the art are effective for this blending step.

Another procedure which may be employed is a devolatilization-extrusion method, wherein separate streams of solutions of the polyester resin and photochromic material are subjected to mixing, compounding, devolatilization and extrusion in commercially available devices. In the devolatilizer-extruder, the mixture is worked in a chamber under heat and vacuum so that new surfaces of the resin mixture are continuously and rapidly exposed to vacuum to remove the solvent before extruding the product. The term "devolatilization" as herein employed refers to the step in which the nonresinous volatile material is removed from the solution of the resin. The apparatus which simultaneously devolatilizes and extrudes the material comprises a chamber with one or more screws having a close tolerance with the wall for compounding the material in its passage therethrough, and at least one vacuum chamber for removing the volatile components of the feed. The action of working the material under the close tolerance of the screws not only intimately blends the mixture but generates substantial heat which aids in the devolatilizing of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or non-volatile modifiers, fillers, lubricants, stabilizers, plasticizers, colorants or the like, may be incorporated into the novel compositions of this invention and extruded therewith.

The vacuum sections of the devolatilizer-extruder are heated to temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the two streams are introduced into the devolatilizer-extruder the increased temperature causes volatilization of the solvent therefrom. At the same time, because the extruder is maintained at subatmospheric pressures, the volatile material is withdrawn or volatilized from solutions of polyester resin and photochromic material.

As mentioned above, the compositions of the present invention have many uses some of which include memory devices such as optical analogue computers, devices for temporary data storage, temporary photographic proofs, light storage, optical masks, wall panels, costume jewelry, toys, window display cases and the like.

The compositions of the present invention may further be modified by the addition of such materials as fillers, lubricants, plasticizers, colorants, etc. as mentioned above. It is also possible to lengthen the life of the compositions by incorporating various amounts of ultraviolet light absorbers into them or by coating articles formed from the compositions, with a material containing an ultraviolet light absorber. When additives such as these are added, any conventional compound known to function as a UV absorber may be employed. Examples of such compounds are the 2-hydroxy benzophenones, e.g. 2,4-dihydroxy benzophenone; the 2(2-hydroxyphenyl)benzotriazoles, e.g. 2(2-hydroxy-4-methoxyphenyl)benzotriazole and the like. In this manner, the photochromic life of the photochromic inorganic oxide additive is lengthened by preventing an extraneous amount of ultraviolet light from coming into contact with the photochromic material. When absorbers of this type are added, amounts up to about 20%, by weight, based on the weight of the polyester resin, may be used.

The following examples are set forth for purposes of illustration only and are not to be construed as limitations on the present invention except as set forth in the appended claims. All parts and percentages are by weight unless otherwise noted.

Example 1

A commercially available polyester resin produced from maleic anhydride, phthalic anhydride and propylene glycol (14.5/46.5/39.0) is washed three times with an aqueous solution of sodium carbonate at 20° C. to rid the polyester of residual anhydride. The polyester is then dried over calcium chloride for two hours. To 100 parts of the dried polyester resin, are added 0.25 part of azobisisobutyronitrile, 61 parts of styrene and 20%, by weight, based on the polyester of a singly doped metal oxide, $TiO_2$ activated by 0.2% of $Fe_2O_3$, by weight. The resultant mixture is milled on a three-roll mill for two hours at room temperature. The thoroughly admixed components are poured between glass plates and sealed. The plates are heated for 12 hours at 60° C. and for 1½ hours at 80° C. The resultant polyester casting turns to tan upon contact thereof with ultraviolet light of 400 mμ wavelength.

Following the procedure of Example 1, various other photochromic inorganic oxide materials are added to the commercially available polyester resin in equal amounts as set forth therein. However, in regard to Examples 8, 9, 10 and 11, 0.2%, by weight, based on the polyester resin weight, of each of the $Fe_2O_3$ and FeO and 0.02%, by weight, based on the polyester weight, of the NiO and CuO is employed. In Examples 26–29, the photochromic material was produced by reacting 12 moles of the $MoO_3$ or $WO_3$ with one mole of the other oxide used. In Examples 30–35, the ratio was 6 moles of the $MoO_3$ or $WO_3$ to 1 mole of the other oxide. The results are set forth in Table I below.

TABLE I

| Example | Activated With— | Color Change | Time Activation, Sec. |
|---|---|---|---|
| 2 | $TiO_2$+FeO | Off-white to tan | 60 |
| 3 | $TiO_2$+$Cr_2O_3$ | Off-white to light tan | 1,800 |
| 4 | $TiO_2$+CuO | do | 120 |
| 5 | $TiO_2$+NiO | do | 120 |
| 6 | $TiO_2$+$MnO_2$ | do | 100 |
| 7 | $TiO_2$+$Mn_2O_5$ | do | 100 |
| 8 | $TiO_2$+$Fe_2O_3$+NiO | Off-white to deep tan | 60 |
| 9 | $TiO_2$+$Fe_2O_3$+CuO | do | 60 |
| 10 | $TiO_2$+FeO+NiO | do | 60 |
| 11 | $TiO_2$+FeO+CuO | Off-white to brown | 60 |
| 12 | $Nb_2O_5$+$Fe_2O_3$ | Off-white to grey | 1,200 |
| 13 | $Nb_2O_5$+FeO | do | 1,200 |
| 14 | $Nb_2O_5$+$Cr_2O_3$ | do | 2,400 |
| 15 | $Nb_2O_5$+CuO | do | 1,400 |
| 16 | $Nb_2O_5$+$V_2O_5$ | do | 2,400 |
| 17 | $Nb_2O_5$+$MnO_2$ | do | 1,500 |
| 18 | $Nb_2O_5$+$Mn_2O_5$ | do | 1,500 |
| 19 | $Al_2O_3$+$Cr_2O_3$ | do | 3,600 |
| 20 | $Al_2O_3$+$V_2O_5$ | do | 3,600 |
| 21 | ZnO+CuO | do | 2,700 |
| 22 | ZnO+$V_2O_5$ | do | 2,700 |
| 23 | $SnO_2$+CuO | Off-white to deep tan | 2,700 |
| 24 | $ZrO_2$+CuO | Off-white to grey | 2,700 |
| 25 | $ZrO_2$+NiO | do | 2,700 |
| 26 | $TiO_2$·$WO_3$ | Faint yellow to blue green | 60 |
| 27 | $TiO_2$·$WO_3$ | Faint yellow to deep blue-green | 300 |
| 28 | ZnO·$MoO_3$ | White to light blue / White to blue | 60 / 300 |
| 29 | $ZrO_2$·$MoO_3$ | White to light blue / White to blue | 60 / 300 |
| 30 | $ZrO_2$·$WO_3$ | Faint yellow to light blue-green | 60 |
| 31 | $SnO_2$·$MoO_3$ | White to light blue / White to blue | 60 / 300 |
| 32 | $SnO_2$·$WO_3$ | Faint yellow to light blue-green | 60 |
| 33 | $GeO_2$·$WO_3$ | do | 60 |
| 34 | $GeO_2$·$MoO_3$ | White to light blue / White to blue | 60 / 300 |
| 35 | $TiO_2$·$MoO_3$ | White to blue | 300 |

I claim:

1. A composition of matter comprising a polyester resin selected from the group consisting of (1) those produced from a polycarboxylic acid free of non-benzenoid unsaturation and a saturated polyhydric alcohol and (2) those produced from a α,β-ethylenically unsaturated polycarboxylic acid, a polyhydric alcohol and a cross-linkable monomer possessing a polymerizable $CH_2$=C< group having uniformly dispersed throughout the body thereof an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$, and $Mn_2O_5$, (C) $Al_2O_3$ doped with an oxide selected from the group consisting of $Cr_2O_3$ and $V_2O_5$, (D) ZnO doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$.

2. A composition according to claim 1 containing, in addition to the inorganic photochromic material, an ultraviolet light absorber.

3. A composition of matter comprising a polyester resin selected from the group consisting of (1) those produced from a polycarboxylic acid free of non-benzenoid unsaturation and a saturated polyhydric alcohol and (2) those produced from a $\alpha,\beta$-ethylenically unsaturated polycarboxylic acid, a polyhydric alcohol and a cross-linkable monomer possessing a polymerizable $CH_2{=}C{<}$ group having uniformly dispersed throughout the body thereof an inorganic photochromic material selected from the group consisting of (A) $TiO_2$ doped with an oxide selected from the group consisting of $Fe_2O_3$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$, and $V_2O_5$, (D) ZnO doped with an oxide selected from the group consisting of CuO and $V_2O_5$, (E) $SnO_2$ doped with CuO, and (F) $ZrO_2$ doped with an oxide selected from the group consisting of CuO and NiO.

4. A composition of matter comprising a polyester resin selected from the group consisting of (1) those produced from a polycarboxylic acid free of non-benzenoid unsaturation and a saturated polyhydric alcohol and (2) those produced from a $\alpha,\beta$-ethylenically unsaturated polycarboxylic acid, a polyhydric alcohol and a cross-linkable monomer possessing a polymerizable $CH_2{=}C{<}$ group having uniformly dispersed throughout the body thereof an inorganic photochromic material selected from the group consisting of (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_4$ and $WO_3$ and (K) $GeO_2$ reacted with an oxide selected from the group consisting of $MoO_4$ and $WO_3$.

5. A composition of matter comprising a polyester resin selected from the group consisting of (1) those produced from a polycarboxylic acid free of non-benzenoid unsaturation and a saturated polyhydric alcohol and (2) those produced from a $\alpha,\beta$-ethylenically unsaturated polycarboxylic acid, a polyhydric alcohol and a cross-linkable monomer possessing a polymerizable $CH_2{=}C{<}$ group having uniformly dispersed throughout the body thereof an inorganic photochromic material selected from the group consisting of (a) $TiO_2$ doped with a mixture of $Fe_2O_3{+}NiO$, (b) $TiO_2$ doped with a mixture of $Fe_2O_3{+}CuO$, (c) $TiO_2$ doped with a mixture of $FeO{+}NiO$ and (d) $TiO_2$ doped with a mixture of $FeO{+}CuO$.

6. A composition according to claim 1 wherein the polyester resin is a thermoplastic resin esterification product of a saturated polycarboxylic acid and a saturated polyhydric alcohol.

7. A composition according to claim 3 wherein the polyester resin is a thermoplastic resin esterification product of a saturated polycarboxylic acid and a saturated polyhydric alcohol.

8. A composition according to claim 4 wherein the polyester resin is a thermoplastic resin esterification product of a saturated polycarboxylic acid and a saturated polyhydric alcohol.

9. The composition according to claim 5 wherein the polyester resin is a thermoplastic resin esterification product of a saturated polycarboxylic acid and a saturated polyhydric alcohol.

10. A composition according to claim 1 wherein the polyester resin is a thermosetting resin esterification product of an $\alpha,\beta$-ethylenically unsaturated polycarboxylic acid, a polyhydric alcohol and a cross-linking monomer having a polymerizable $CH_2{=}C{<}$ group.

11. A composition according to claim 3 wherein the polyester resin is a thermosetting resin esterification product of an $\alpha,\beta$-ethylenically unsaturated polycarboxylic acid, a polyhydric alcohol and a cross-linking monomer having a polymerizable $CH_2{=}C{<}$ group.

12. A composition according to claim 4 wherein the polyester resin is a thermosetting resin esterification product of an $\alpha,\beta$-ethylenically unsaturated polycarboxylic acid, a polyhydric alcohol and a cross-linking monomer having a polymerizable $CH_2{=}C{<}$ group.

13. A composition according to claim 5 wherein the polyester resin is a thermosetting resin esterification product of an $\alpha,\beta$-ethylenically unsaturated polycarboxylic acid, a polyhydric alcohol and a crosslinking monomer having a polymerizable $CH_2{=}C{<}$ group.

References Cited by the Examiner

UNITED STATES PATENTS 3,077,398   2/1963   Jones _____ 96—1
3,113,117   12/1963  Gosselink et al. _____ 260—39

OTHER REFERENCES

McTaggart et al.: "Phototropic Effects in Oxides I," J. Appl. Chem., London, vol. 5, December 1955, pp. 643–653.

Bear et al.: "Phototropic Effects in Oxides II," J. Appl. Chem., London, vol. 8, January 1958, pp. 72–76.

NORMAN G. TORCHIN, *Primary Examiner.*

A. L. LIBERMAN, C. E. DAVIS, *Assistant Examiners.*